April 12, 1960 — R. L. METCALFE ET AL — 2,932,498
HEAT-TREATING FURNACE FOR PARTICULATE SOLIDS
Filed June 25, 1957 — 2 Sheets-Sheet 1
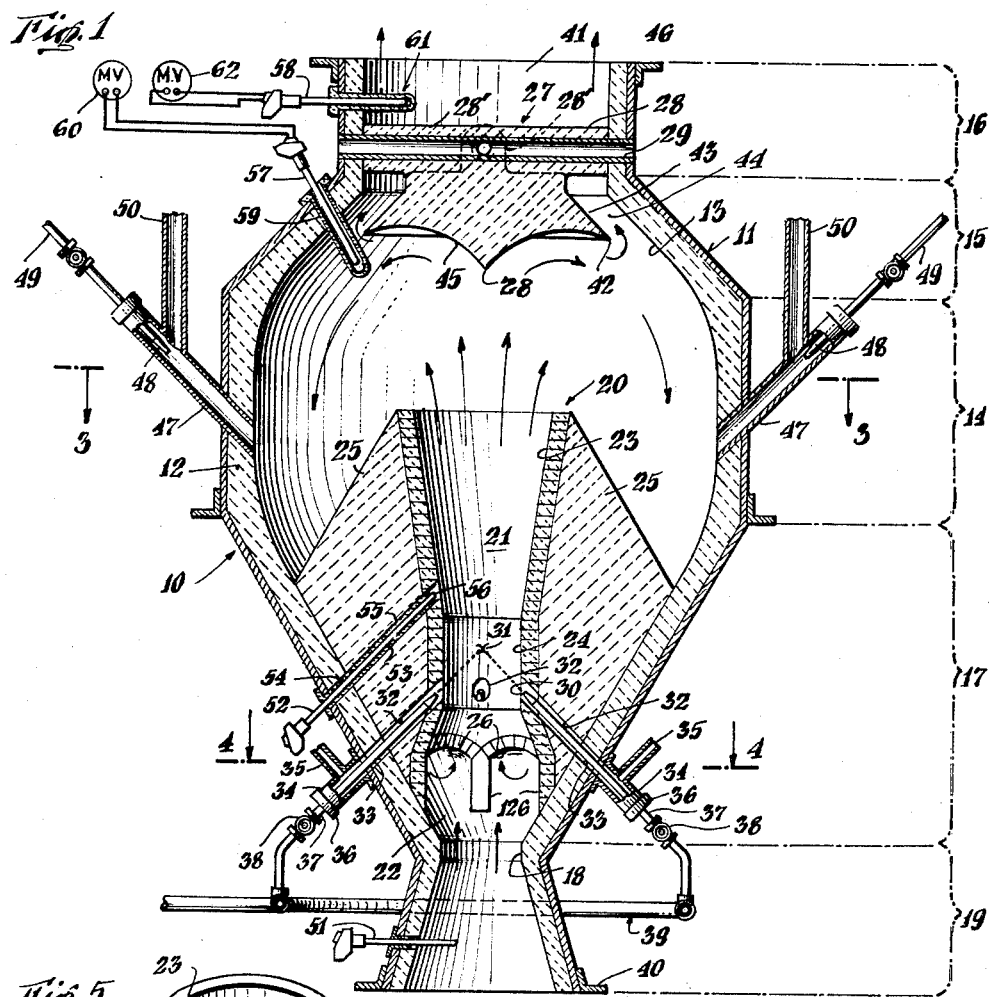
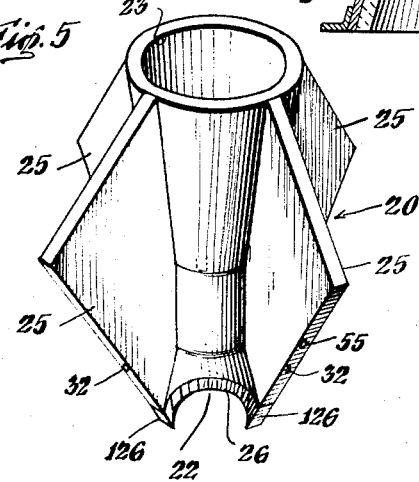
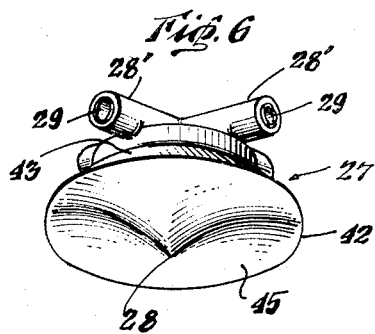

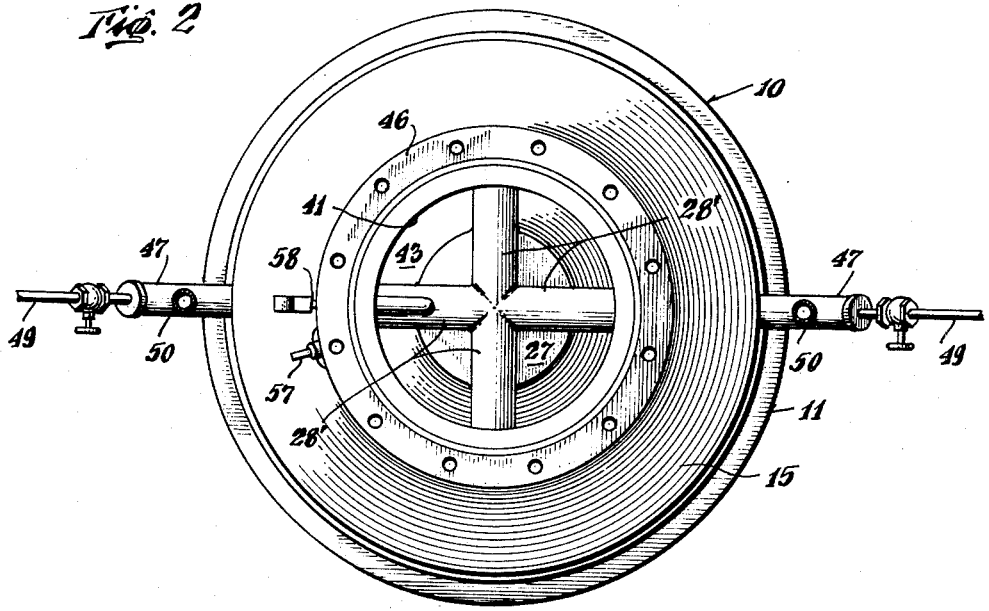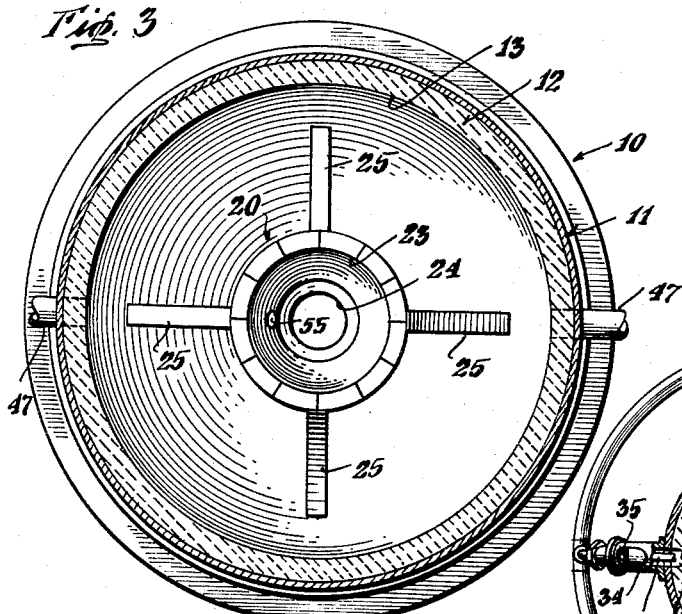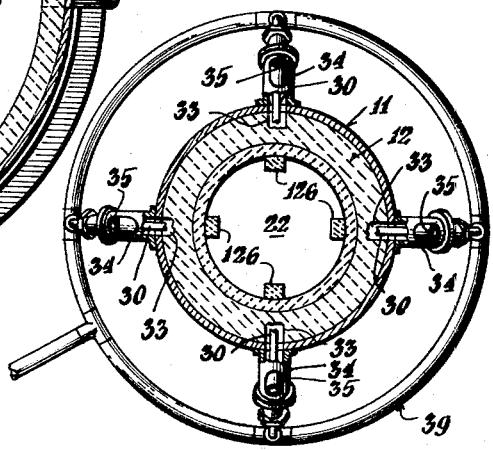

United States Patent Office 2,932,498
Patented Apr. 12, 1960

2,932,498

HEAT-TREATING FURNACE FOR PARTICULATE SOLIDS

Richard Lewis Metcalfe and Virgil Ellsworth Metcalfe, both of Mexico City, Mexico Application June 25, 1957, Serial No. 667,926

Claims priority, application Mexico February 4, 1957

17 Claims. (Cl. 263—21)

The present invention relates to furnaces for heat-treating particulate solids and, more particularly, to such devices in the form of reactors wherein solids and gases are chemically reacted together at elevated temperatures. This apparatus is especially suited to effecting reaction between finely divided raw solids to form cement clinker, although its use is not limited to production of such solids.

Commercial cement of the Portland and similar types is made by the reaction between suitable proportions of calcareous materials and argillaceous materials. These materials are mixed in the proper proportions and ground to a state of fine subdivision. This grinding may be done in either the dry or wet condtion, and the resulting pulp is the raw feed. In all further references to the raw feed in the description of this invention, it is assumed that the feed is of the correct chemical composition, that it is suitably ground and thoroughly mixed, and that it is in the form of a dry powder of such fineness that about 90% of the particles thereof are of a size that will pass through a 200 mesh screen. As with any cement raw feed, a minimum of superfines is desirable.

In the commonly accepted commercial practice prevailing at present, the raw feed is introduced into the upper end of an inclined rotary kiln. As the kiln rotates, the raw materials pass slowly down the kiln countercurrent to the hot gaseous products of combustion from the fuel burners located at the lower end of the rotary kiln. During its passage through the kiln, several chemical changes occur in the raw material feed. First, all free water is driven off, followed by the combined water of hydration. Carbon dioxide then dissociates from the carbonates in the feed. Finally, the remaining oxides of calcium, aluminum, iron, etc., react exothermically with the silica to form new compounds. Some of these compounds melt partially to fuse the charge. It is the action of these melting compounds that causes the agglomeration of the finely divided materials to form cement clinker. The new compounds formed impart to the resultant clinker, when finely ground, its hydraulic setting qualities.

The rotary kiln, as a producer of cement clinker, has a number of disadvantages. The poor contacting between the solid and gaseous phases results in poor heat transfer between these phases. The great volume of the kiln as compared to the volume of materials being treated within the kiln at any time leads to serious losses in heat as radiation from the great exposed outer surface of the kiln which is at an elevated temperature. The losses from this source per unit weight of clinker production are further amplified by the long residence time of relatively small amounts of material within the kiln. Further serious heat losses result from the internal radiation of heat from the hot end of the kiln toward the cooler end of the kiln through the gas space above the solids within the kiln, which gas is essentially transparent to thermal radiation. The rotary kiln is inherently a thermally inefficient device.

A modern rotary kiln is a large, heavy item of equipment which must be continuously rotated on its inclined axis, which requires the expenditure of considerable power. Obviously, much of this power is expended for the sole purpose of moving the mass of the kiln, and has no direct function as to the processing of the material within. A rotating machine as large and heavy as a modern rotary kiln is intrinsically an expensive item.

It is a general object of the present invention effectively to minimize or eliminate many of these problems and disadvantages of prior art practices by use of the apparatus of the present inveintion. External thermal radiation losses are reduced because of lower ratio of exposed external reactor surface to productive capacity. This ratio is lowered because of the greatly reduced residence time of the raw materials within the reactor. Internal radiation losses are reduced by providing an atmosphere within the reactor that is essentially opaque to thermal radiation. No power is required for the movement of the reactor, which is stationary. Initial cost is reduced because the reactor is smaller, lighter, and has no moving parts.

A further object of this invention is to effect the desired chemical reaction between the calcareous and argillaceous components of the finely divided raw material in a minimum processing time causing them to be brought to the necessary reaction temperature as rapidly as possible and without violating the basic principle of preheating the solid phase by causing it first to contact the coldest gases in the reactor. Another object of the invention is to attain an improved thermal efficiency over the usual methods by decreasing the direct heat loss per unit weight of clinker by radiation and convection, both from the outer shell of the reactor and within the reactor.

Still another object of the invention is to cause the flow of the suspending gas to be such that the suspended particles of finely divided raw materials are, for the most part, carried into the reacting zone rather than being carried out of the reactor by the gaseous stream leaving the reactor. It is also an object of the invention to provide the reactor in such form and so operate it that the clinker end-product will not be permitted to leave the reactor until it has acquired sufficient agglomeration and density to insure that it is a product of good quality, and that it be substantially uncontaminated by unreacted or insufficiently reacted raw materials.

An additional object of the present invention is efficiently to produce by simple operation of this apparatus product clinker of such physical size that it is unnecessary to crush the clinker to reduce it to a granular size suitable as the feed for standard grinding mills, as is the case in preparing cement clinker produced by the usual prior art procedure for feeding to standard cement grinding mills.

Yet another object of the invention is to provide a relatively simple but unique method of determining the quantity of particulate solids entrained in the gases flowing or circulating in the heat-treating chamber, advantage being taken of the facts that while the gases which includes those exhausted from the chamber are substantially transparent to thermal radiation solids are substantially opaque to thermal radiation, temperature responsive means being located in the chamber at a point to which the amount of heat radiated from the combustion zone will be controlled by the intervening quantity of entrained solids thereby permitting effective employment for this purpose of temperature comparing indicating means.

A still further object of the invention is to provide a structural embodiment of the apparatus which is readily and economically constructed and which permits efficient use and operation thereof in the production of particulate cement of excellent quality.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in in the claims.

For a fuller understanding of the nature and objects of the invention reference should be had to the following detailed description taken in connection with the accompanying drawings, in which:

Fig. 1 is a vertical section, with parts broken away, taken axially of a structural embodiment of the heat-treating furnace of the present invention;

Fig. 2 is a top plan view, with parts broken away, of the apparatus shown in Fig. 1, a pair of temperature sensing devices thereof which may be located in the same radial plane being shown in different radial planes to avoid confusion;

Figs. 3 and 4 are transverse sections, with parts broken away, taken respectively on lines 3—3 and 4—4 of Fig. 1;

Fig. 5 is a perspective view of the Venturi structure shown in Fig. 1 as viewed from above at a point making an angle of about 135° to the plane of sectioning in Fig. 1; and Fig. 6 is a perspective view of the baffle structure depicted in Fig. 1 as viewed from below.

Referring to the drawings, in which like numerals identify similar parts throughout, it will be seen that the heat-treating furnace, there shown at 10 by way of example as designed for advantageous use in the production of granular cement clinker, comprises an upright symmetrical shell 11 adequately lined with a suitable refractory material 12 to define therein a single chamber or compartment 13. The shell 11 and its refractory lining 12 are so shaped as to define a substantially cylindrical mid-section 14 superposed by a belled top section 15 and leading to a gas exhaust section 16. The lower portion of the chamber is defined by a funnel-shaped section 17 below the mid-section 14, converging down to a constricted air inlet and clinker discharge opening 18 which is small in diameter compared to the main body or mid-section 14 of the reactor 11. A tapering nozzle section 19 leading upwardly to the air inlet opening 18 is defined therebelow.

Mounted within the reactor chamber 13, preferably coaxially thereof, is an upright or vertical Venturi structure 20 constructed of high temperature refractory material and having a throated through Venturi passage 21 provided with a bottom intake end 22, a belled top discharge end 23 and an intermediate constricted throat 24. The Venturi structure 20 is supported, preferably coaxially, in the funnel-shaped section 17 by suitable refractory supports or buttresses 25—25, extending radially therefrom and preferably constituting a part of the Venturi structure as illustrated in Fig. 5. Cut-outs or opening notches 26—26 are provided at the intake bottom end 22 between successive pairs of the buttresses 25, 25 to define a plurality of refractory supporting arches, with the columns 126—126 of the arches aligned with or coinciding with the buttresses. In this manner free passage is effected from that portion of the chamber 13 surrounding the Venturi structure 20 into the lower bell of the Venturi through the passageways 26—26 formed by these arches. For cement clinker reaction, this Venturi structure 20 is preferably constructed of basic or neutral refractory material to resist the chemical reaction of the basic clinker formed within the throat 24 of the Venturi. Ample space is provided between the bottom lip, or inlet mouth, of the Venturi, as defined by each arch-defining notch 26, and the converging side wall faces of the funnel-shaped section 17 to permit the free flow of gas from outside the Venturi structure and into the entrance mouth 22 of the Venturi passage 21.

Directly above the discharge bell 23 of the Venturi structure 20, and separated from it, is an inverted conical baffle structure 27, preferably in the form of a cusped deflector baffle, the cusp 28 thereof being directed downwardly, as shown, and concentric with the discharge bell of the Venturi structure. This deflector baffle 27 is constructed of high temperature refractory material, and is of such a shape, shown in Fig. 6, as to cause the flow of gas from the Venturi passage 21 to divide uniformly and radially and to flow downward around the outside of the Venturi structure 20. This deflector baffle 27 is suspended from suitable lateral supports, preferably in the form of radial arms 27'—28', each in the form of a pipe section 29 with the outer end of each extending through the walls of the outer shell of the reactor, and centrally communicating to provide through transverse passages each having both ends open. The pipe sections 29—29 are protected by a covering of high temperature refractory material, and the transverse through passages defined thereby and having their ends open to the outer atmosphere provide a means of cooling the pipe supports by permitting the passage of cooling air through them.

In operation, sufficient air for complete combustion of the fuel is forced, by direct forced draft or induced draft, upward through the tapering nozzle 19 and orifice restriction 18. As the rising stream of air flows upward into the Venturi passage 21, its velocity is sufficiently high to entrain and carry upward into the throat 24 of the Venturi the preheated raw material that is flowing down the faces of the converging sides of the reactor and which, because of the small size of its individual particles, cannot pass downward through the relatively high velocity stream of air rising through the orifice. A portion of the gases within the reactor are drawn through notches 26—26 into the mouth 22 of the Venturi due to the aspirating effect of the entering air, and thus creating the downward flow of gases around the outside of the Venturi structure 20. As this mixture of gases and solids, intimately mixed, rises through the Venturi throat 24, the fuel, which may be hydrocarbon gas, fuel oil, or powdered coal, is injected into the Venturi passage 21 by means of several burners 30—30 which pass through the supporting buttresses 25—25 of the Venturi structure. These burners 30—30 are so mounted that the flow of fuel is directed inward toward the axis of the Venturi and upward, and so that the stream of fuel from each burner will impinge against the streams of fuel from all other burners at a common point 31 on the axis of the Venturi passage 21. Due to the contact catalysis effect of hot solids and to the extensive area of those solids, combustion is intense and restricted to a small portion of the Venturi passage 21. Heat transfer from the gaseous combustion products to the suspended solids is virtually instantaneous because of the intimate mixing of the two phases. Flame temperatures in the reactor may be several hundred degrees lower than flame temperatures encountered in the rotary kilns that are commonly used for the production of cement clinker. This is because a much smaller differential temperature between the gaseous and solid phases is required for a given quantity of heat transferred if the phases are intimately mixed, the one suspended in the other.

Each burner 30 extends through a passage or duct of larger diameter for flow therethrough of surroundng air, each passage or duct comprising aligned holes 32 and 33 respectively in one of the buttresses 25 and the chamber wall and communicating by a fitting 34 and inlet 35 of the latter with a source of primary air supplied under pressure. The forcing of primary air through such passages or ducts surrounding the burners 30—30 cools them and prevents accumulation of solids in the cavities or openings about the burner tips in the wall of Venturi throat 24. Thus accumulations about the burners 30—30 which might make difficult their withdrawal from out of their entrance passages for serving are avoided. Packing gland 36 on each fitting 34 forms an air seal around the supply tube 37 of each burner 30, and each burner supply tube is conventionally connected through a shut-off valve 38 to supply piping 39.

The combustion zone in the Venturi passage 21 surrounding the point 31 in throat 24 and extending up into the discharge bell outlet 23 may be considered the zone of reaction of the raw materials when the apparatus is employed to produce reacted solids in the form of bodies of clinker, such as cement clinker. A reaction zone temperature of approximately 2600° F. will raise the raw materials to a sufficiently high temperature to induce the exothermic reaction characteristic of the formation of the calcium compounds in cement clinker. As this temperature is reached, collisions between the individual particles of the raw material result in chemical reaction, the resulting clinker being more dense than either of its constituent parts. The clinker particles increase in mass as more heated particles of raw material collide with the reacting clinker particles, and as reacting clinker particles collide with each other. The smaller clinker particles or solid fines are carried up and out of the Venturi passage 21 by the gases emitting from the top discharge end of the latter and are recirculated with the entering of raw material, passing again through the combustion and reacting zone where their size is increased by further agglomeration. The larger clinker particles are suspended in the rising stream of gas in the Venturi until they have acquired sufficient mass to permit them to fall downward through the rising gas stream of incoming air and out through the air orifice 18. The size and density of the clinker particles leaving the reactor through the air inlet nozzle 19 are thus effectively controlled by the upward velocity of the air entering the reactor through orifice 18. These hot clinker particles, falling against the rising stream of air, are effectively cooled and in turn effectively preheat the combustion air. Any suitable device to create intimate contacting of combustion air and clinker may be used beneath the reactor to serve as a clinker cooler, suitably connected, if desired, to nozzle flange 40. Several types of such clinker coolers are in current industrial use and do not form a part of this invention.

Exhaust section 16 defines an outlet passage 41 at the top of the belled top section 15 in which the baffle structure 27 is suspended. The diameter of the circumferential edge 42 of the baffle structure may be about equal in diameter to the diameter of the exhaust passage 41 and the baffle back or top side 43 may be frusto-conical having approximately the same degree of slope as the inner face of lining 12 in belled top section 15, as shown in Fig. 1. There is thus defined therebetween a conical annular exit space or exhaust opening 44 communicating the chamber 13 to the exhaust passage 41. The waste gases from the reactor, representing the gaseous products of combustion, nitrogen from the incoming air, and the carbon dioxide from the dissociation of the calcareous and siliceous raw materials, as well as water vapor deriving from the absorbed water and water of hydration of the raw materials, leave the reactor through the annular opening 44 between the deflector baffle 27 and the refractory lining 13 of the reactor section 15. The curvature of the bottom face 45 of the baffle 27 and the flow of gases within the reactor are such that the waste gases must effect a reversal of direction in order to pass through the tortuous exit and escape from the reactor. As all solid particles entrained in the waste gases possess a density enormously greater than the density of the gas itself, the momentum of these particles carries them, for the most part, past the waste gas outlet 44 and they continue outward and downward to be carried once more into the reaction zone. This separating action is a manifestation of the gas reversal principle employed in all impingement type entrainment separators. The small quantity of dust leaving the reactor in the waste gases can be recovered and returned to the raw materials feed by employing dust separators of conventional design in the waste gas circuit, which may be connected by flange 46 to exhaust section 16.

Raw materials in the form of particulate solids are fed into the reactor chamber 13 at a point along the path of recirculation of solids-laden gases, and thus preferably at points between the baffle surface 45 and the Venturi intake 22. For this purpose feed tubes or pipes 47, 47 may be provided each of which extends through aligned holes in shell 11 and lining 12 in the intermediate substantially cylindrical section 14, preferably directed obliquely down to direct the feed therethrough of particulate raw material into the path of recirculating gases in the general direction of their flow, as will be apparent from Fig. 1.

The thermal efficiency of the reactor system can be raised by recuperation of sensible heat from the waste gases by utilizing the gases to preheat the raw feed material in one of several commercially available preheaters, which may be connected by flange 46 to exhaust section 16, or heat recuperation may be effected by passing the waste gases through a waste-heat boiler. If a raw feed material pre-heater is employed, it is possible that the pressure drop across the last stage of the pre-heater would be such that the pressure within the reactor body would be greater than the pressure at the point where the raw material leaves the pre-heater by as much as several inches of water differential pressure. In this event, in order to prevent gases from the reactor flowing upward through the raw material feed pipes 47, 47 with sufficient velocity to entrain the finely divided raw material and carry it back upward, small air ejectors 48, 48 mounted within the feed pipes and directed toward the reactor chamber 13 force the raw material into the chamber and eliminate the possibility of gases therefrom passing up the raw feed pipes. Compressed air for this purpose enters through valved supply pipes 49, 49, and the raw materials are fed to the feed tubes or pipes 47, 47 in the vicinities of the ejector nozzles 48—48 by supply tubes 50, 50.

It is emphasized that an important feature of the reactor is the recirculating of the gases and insufficiently reacted raw materials through the combustion and reaction zone by the action of the gaseous flow pattern, which approximates a torus of infinitesimal internal radius. This flow pattern is essentially symmetrical with respect to the vertical axis of the illustrated reactor and it divides evenly between the supports 25—25 of the Venturi structure 20, passing downward between these supports and reentering the Venturi passage 21 through the openings 26—26 at the bottom of the Venturi provided for this purpose. This flow pattern is induced by several complementary actions. The aspirating effect of the incoming combustion air through orifice 18 and upward into the mouth 22 of the Venturi draws the surrounding gas and raw material upward into the Venturi passage 21. The deflector baffle 27 above the Venturi discharge opening tends to turn the gases exhausting from the Venturi discharge bell 23 downward and between the outer side or portion of the Venturi structure 20 and the inner wall of the reactor in funnel-shaped section 17. There exists a chimney effect in the Venturi passage 21 due to the difference in gas densities of the gases within the Venturi passage and the gases surrounding the Venturi structure. This difference in densities derives from several causes. The higher temperature within the Venturi passage due to the combustion taking place therein causes the gases therein to be less dense. Carbon dioxide, which dissociates from the raw materials during the process of reaction, as well as the carbon dioxide from the oxidation of the fuel, causes the gases within the reactor chamber 13 to have an average molecular weight substantially higher than that of air. Hence, as the combustion air enters the bottom of the reactor through orifice 18, its diluting effect with the recirculating reaction gases yields a mixture of lower average molecular weight than the average for the gases surrounding the Venturi structure 20. The introduction of the raw feed material into the recirculating gas stream surrounding the Venturi structure by way of feed tubes 47, 47 cools that gas stream substantially, causing a decided chimney effect resulting from the difference in density of the cooler gases surrounding the Venturi structure and the heated gases within the Venturi passage.

An additional tendency for upward flow in the Venturi passage 21 comes from the injection of the fuel into the Venturi passage from the burners 30—30. These burners are so mounted that the injected fuel stream from each burner is directed toward the axis of the Venturi and is inclined upward. The streams of fuel from all burners collide at the common point 31 on the axis of the Venturi in the throat 24. Due to the upward inclination of all fuel streams, the resultant flow of fuel after mutual collision of all fuel streams is vertical and upward at a velocity depending upon the angle of inclination of the fuel burners and the velocity of the individual fuel streams before collision. Thus the entering fuel brings with it a certain kinetic energy which yields, after mutual collision, a resultant component acting vertically and upward. This kinetic energy is not lost on combustion of the fuel, but rather imparts to the gaseous products of combustion such upward velocity as to produce a kinetic energy of the combustion products to equal the kinetic energy of the original reactants. Kinetic energy is also imparted to the down flowing recirculating gases as they are approaching the Venturi entrance 22 by the forced feed through oblique feed tubes 47, 47, which tends to draw the gases discharged from the Venturi passage 21 away therefrom.

In order to start the operation of the reactor, a small flame is maintained at the burners 30—30 without introducing raw feed material into the reactor chamber 13 until the refractory parts of the reactor have attained a temperature of about 1400° F. A small flow of feed or particulate raw solids is then introduced into the reactor chamber 13 by the feed injectors through their feed tubes 47, 47, but not more than can be preheated to about 1200° F., by radiation and contact with the hot refractory lining 12. Once the raw material feed within the reactor chamber 13 has attained a temperature of about 1200° F., the combustion will be self-sustaining so long as fuel and air continue to enter the reactor. The raw material feed rate, the combustion air rate, and the fuel rate can then be raised smoothly to the normal production rates.

If liquid fuel, such as Bunker C fuel oil, is being injected by the burners 30—30 it should be adequately preheated to insure satisfactory atomization upon issuing from the burners, and to insure that a minimum of heat is absorbed by the fuel oil from the combustion chamber to raise it to its ignition temperature.

Control of the reaction process is effected through the use of standard industrial control elements. A thermocouple 51 in the combustion air stream coming in through nozzle section 19 and orifice 18 indicates, by means of suitable meter means, such as a millivoltmeter (not shown), the temperature of the incoming combustion air which is preferably pre-heated as previously described. A noble metal thermocouple 52 suitably protected by a ceramic protection tube 53, inserted in aligned holes 54 and 55 extending respectively through the reactor chamber wall and one of the refractory supports 25 of the Venturi structure 20, with the sensing tip 56 near the inner surface of the Venturi throat 24 indicates, by means of other suitable meter means, such as another millivoltmeter (also not shown), a relative temperature within the throat.

Other control elements or devices are employed to provide unique comparison indicator readings from which an operator readily can determine the quantity of particulate solids entrained in the flowing or circulating gases in the heating-treating or reactor chamber. This may be provided in the form of a pair of thermocouples 57 and 58. Thermocouple 57 is inserted through a hole through the wall of belled top section 15, or at any other suitable point where the temperature of the refractory lining 13 may be taken, and is suitably protected by a ceramic protection tube 59 extending through this hole and surrounding the thermocouple physically to isolate it from the solids-laden gases flowing therepast. Suitable meter means, such as a millivoltmeter diagrammatically indicated at 60 in Fig. 1, provides readings of temperatures sensed by thermocouple 57, i.e., the temperature to which the refractory lining 12 in that part of the reactor is being exposed. This temperature is higher than the actual temperature of gases sweeping by the thermocouple 57 because this thermocouple and the refractory lining 12 are exposed to the direct radiation or the heat of radiation emanating from the hottest part of the reactor, which is the combustion zone or throat 24 of the venturi passage 21.

The thermocouple 58 is mounted in the exhaust opening or passage 41, preferably by being inserted through a hole in the wall of exhaust section 16, and may also be suitably protected by a suitable protection tube 61 which may be similar to ceramic tube 59 and preferably is identical thereto to insure the best differential reading for the thermocouples 57 and 58. Other suitable meter means, such as another millivoltmeter diagrammatically shown at 62, is connected to thermocouple 58 so that the actual temperature of the exhaust gases leaving the reactor will be essentially indicated by this second meter. Since solids are relatively opaque to radiant heat a relatively large solid body dissociated in a heat conductive sense from thermocouple 58 may be interposed between it and the source of radiant heat in the combustion zone as an effective shield efficiently to minimize or eliminate radiant heat emitted from the venturi passage or reaction zone from affecting this thermocouple and the exhaust gas temperature readings dictated thereby at meter 62. The baffle structure 27 serves this purpose in an effective manner. By virtue of the cooling of the supporting arms 28—28 which connect the baffle body proper to the wall of the exhaust section 16, by airflow through their pipes 29, heat transfer by conduction to thermocouple 61 from the radiant heat shielding baffle body is minimized.

The difference in temperatures indicated by the meters 60 and 62 of thermocouples 57 and 58 is an indication of the quantity of radiant heat reaching the exposed thermocouple 57 which is also an indication of the quantity of suspended solids being carried by the recirculating stream of gases within the reactor chamber 13. As the gases are substantially transparent to thermal radiation and solids opaque to thermal radiation, the meter 60 for thermocouple 57 will indicate a higher temperature than the meter 62 for thermocouple 58 when there is a low solids concentration suspended in the gases. The meter 60 for thermocouple 57 may indicate substantially the same temperature as that indicated by meter 62 for thermocouple 58 when there is a high solids concentration suspended in the gases because the resultant suspension is essentially opaque to thermal radiation. The suspended solids and the gases which carry them are of nearly equal temperatures because of the intimate mixing of the two phases. Therefore, the difference in temperatures indicated by the meters 60 and 62 in response to the sensing operation of their thermocouples 57 and 58 provides an indication as to when the reactor is heavily loaded with suspended solids and has reached its maximum practical raw materials feed rate.

The heat responsive means or thermocouple 58 which indicates by its meter 62 the temperature of the exhaust gases need not be entirely free from effects of heat of radiation, just as the heat responsive means or thermocouple 57 which is intended to indicate by its meter 60 the amount of radiant heat imposed with convective heat thereon need not be entirely free from effects of heat conducted thereto, in order that the temperature comparing indicating means or comparative meter means comprising millivoltmeters 60 and 62 provide informative comparison readings to indicate the quantity of particulate solids entrained in the gases flowing or circulating in chamber 13. Variation of the quantity of radiant heat reaching thermocouple 57 causes the reading of its meter 60 to vary in accordance therewith regardless of the facts that convective heat reaches and some heat of conduction may reach this thermocouple. The thermocouple 58 and its meter 62 provide control readings with which to compare the readings of the meter 60 for indicating by the differential readings the percentage of solids entrained in the chamber gases intervening the source of radiant heat in the combustion zone and the location of thermocouple 57.

The temperature in the combustion and reaction zone of the Venturi passage 21 must be maintained at a suitable level to insure complete reaction of raw materials being processed. This temperature is controlled by the rate at which fuel is injected into the reaction zone, or raw material admitted to the reactor chamber 13. It can also be controlled, within limits, by the rate at which combustion air is permitted to enter the reactor chamber through inlet nozzle 19 and its orifice 18, so long as this quantity of air is always sufficient to effect complete combustion of the fuel.

The analysis of the oxygen concentration in the waste gases issuing from the reactor is used as an indication of the ratio of combustion air to fuel and is, therefore, an indication of the thermal efficieny of the combustion process. Such oxygen concentration can be determined by a suitable sample probe in the waste gas stream and a conventional oxygen concentration analytical device. If more than 0.5% to 1.0% uncombined oxygen is present in the waste gases it indicates that excess air over that actually needed to effect complete combustion is unnecessarily being heated by the reactor causing a direct thermal loss. This condition is temporarily permissible, however, if the excess air is intentionally being used to suppress the temperature in the reaction zone until a lower fuel injection rate can reestablish equilibrium at the desired temperature without the use of excess air. If the uncombined oxygen concentration in the waste gases is below 0.5% the possibility of combustibles in the waste gases exists. This condition creates the possibility of secondary combustion when the waste gases contact the atmosphere and is to be avoided.

Variation of the amount of combustion air supplied to or flowing into the reactor chamber 13 will change the velocity of the air through the inlet orifice 18, which will in turn change the lower limiting size of clinker particles that can pass downward through the rising stream of entering combustion air. This does not present an operational problem so long as the combustion air flow rate is maintained above the low flow velocity required to insure that none of the finely divided raw material can descend through orifice 18. A wide range of combustion air rates is available to the operator without violating this limiting condition.

The incoming raw materials supplied through tubes 47, 47, in a state of fine sub-division, are introduced at a point in the reactor chamber 13 such that the flow of the recirculating gas is in a downward direction toward the entrance 22 of the combustion and reaction zone in Venturi passage 21. Thus all incoming raw material is carried into the moving gas stream to eliminate the tendency to particle size classification to be found in many fluidized solids handling techniques. The entering raw materials are first contacted and entrained in the coolest gases in the reactor chamber; nevertheless, these gases are substantially hotter than the incoming raw materials, and these raw materials are thus effectively preheated before being carried into the high temperature reaction and combustion zone.

It will thus be understood that the heat-treating apparatus of the present invention may be used to advantage in subjecting to heat a variety of types of particulate solids, such as for example particulate calcareous and argillaceous materials to react them for efficient production of cement clinker. Use of the apparatus in the manner taught will produce the end product economically because of low heat losses, high productive capacity per unit of cubic volume of the reactor due to short residence time of raw materials within the reactor, susceptibility to almost instantaneous process control due to the relatively small quantity of raw materials within the reacting zone at any instant, and relatively short residence time within the reactor. The aspirating effect of the combustion air entering the reactor, as well as other effects inherent in the reactor design, causes a continuous recirculation of a portion of the gaseous products of combustion through the combustion and reaction zone, this recirculating stream carrying with it into the combustion and reacting zone such finely divided particles as are entrained in the gaseous stream.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described our invention, what we claim as new and desire to secure by Letters Patent is:

1. A heat-treating furnace for production of relatively heavy particle size agglomerate bodies of solids from raw particulate solid materials under the influence of relatively high heat comprising, in combination, an upright chamber having a bottom opening serving simultaneously as a gravity discharge down flow outlet for heavy agglomerated heat-treated particle size solids constituting the product and an up flow combustion air inlet, means defining an exhaust gas opening in the top thereof for escape of gaseous products of combustion, an upright tubular Venturi structure having a bottom intake end and a top discharge end with a through updraft passage extending up from the intake end to the discharge end and with a section of this passage defining a combustion zone, means suspending in said chamber said Venturi structure with the bottom intake end of the latter located and spaced above the common air inlet and solids product discharge opening of said chamber for updraft flow from said opening into said intake end and with the top discharge end of said Venturi structure located and spaced below the exhaust gas opening of said chamber, said Venturi structure being suitably spaced from walls of said chamber to define therebetween a downwardly-extending interior side passage laterally offset outwardly of said Venturi structure extending from the top discharge end to the bottom intake end of said Venturi structure permitting recirculation down this interior side passage of some of the gases emitted from said discharge end to said intake end laden with entrained solid particles, fuel burner means mounted below said discharge end of the through Venturi passage in a position to feed fuel to the combustion zone and direct products of combustion upwardly in said passage, baffle means intervening the exhaust gas opening and the Venturi top discharge end spaced therebetween and overhanging the latter with lateral spacing from chamber wall structure defining therebetween a tortuous exhaust passage therepast, said baffle means being of a shape to direct recirculation of some of the gases discharged from the Venturi discharge end down the interior side passage to the Venturi bottom intake end with solid particles entrained therein while freeing such solid particles from the remainder of the discharged gas during tortuous flow of the latter upwardly through the tortuous passage to the exhaust opening, and feed conduit means communicating the downwardly-extending interior side passage with an external source of supply of raw particulate solid materials for feed of the latter into the solids-laden recirculating gases which will flow down this side passage to the bottom intake end of the Venturi through passage.

2. A heat-treating furnace for production of relatively heavy bodies of solids comprising, in combination, an upright, symmetrically shaped chamber having a funnel-shaped bottom section, a belled top section and an intervening substantially cylindrical side wall section, the bottom end of said funnel-shaped section being provided with a central air inlet opening serving also as a heat-treated solids discharge opening through which heavy agglomerated, heat-treated solids will fall countercurrent to upward inflowing air, the top end of said belled section being provided with a central exhaust gas opening axially aligned with the common air inlet and discharge opening and with the inner wall of said belled section adjacent the exhaust gas opening being conical, an upright Venturi structure having a bottom intake end, a top discharge end and a throated through updraft passage extending between said bottom intake and top discharge ends; means supporting co-axially in said chamber said Venturi structure with its bottom intake end located above the common air inlet and discharge opening and an appreciable portion thereof arranged substantially concentrically in said funnel-shaped section and with its top discharge end located below the exhaust gas opening, said Venturi structure being suitably spaced from the surrounding chamber walls to permit solids-laden gases when emitted from its top discharge end to recirculate therebetween down to its bottom intake end; conduit means to supply fuel directly to the through passage of said Venturi structure for combustion therein with upward flow therethrough; an inverted conical baffle structure having a conical top surface, a lower surface cusped in shape and a circular rim, said baffle structure being suspended and spaced above the top Venturi discharge end substantially concentric with said Venturi structure and spaced below the exhaust gas opening with an annular outlet space communicating with the latter being defined between the inner conical wall of said belled section and the top surface and circular rim of said baffle structure, the exhaust gas opening being of certain transverse size and said inverted conical baffle structure being of such size and so located with respect to the conical inner wall of said belled section and exhaust opening as to require reversed flow of some of the gases emitted from the Venturi discharge end as may pass tortuously up therepast to the exhaust opening to free heat-treated solids therefrom for entrainment in the remainder of the gases recirculated down about said Venturi structure to its bottom intake end by direction of said cusped shaped lower baffle surface; and means to feed raw particulate solids into the gases recirculated in said chamber exterior of the Venturi passage.

3. The heat-treating furnace as defined in claim 2 characterized by said means supporting said Venturi structure in said funnel-shaped bottom section comprising a plurality of substantially radial fins seated in said funnel-shaped section and defining therebetween portions of the path of recirculating gases.

4. The heat-treating furnace as defined in claim 3 characterized by said fuel supply means comprising a plurality of fuel injectors extending through said supporting fins to the throat of the Venturi passage.

5. The heat-treating furnace as defined in claim 2 characterized by the raw particulate solids feeding means as comprising a plurality of downwardly directed injector devices communicating to the chamber through said substantially cylindrical side wall section.

6. The heat-treating furnace as defined in claim 1 characterized by means to indicate the quantity of particulate solids entrained in recirculating gases within said chamber comprising heat responsive means inserted through the wall of said chamber at a point intermediate said Venturi discharge end and said baffle means spaced from the combustion zone in said Venturi structure and in a position to be subjected to the effect of heat radiating from the latter, the combustion zone and point being intervened by a portion of the recirculating path of solids-laden recirculating gases with the quantity of the solids entrained therein serving as a variable shield of the amount of radiated heat reaching said heat responsive means, other heat responsive means located beyond said baffle means in the path of exhaust gases and responsive to heat of the latter, the point of location of the second heat responsive means being beyond appreciable influence of radiant heat emanating from the combustion zone, and temperature comparing indicating means associated with both of said heat responsive means serving as a measure of the quantity of solids entrained in the recirculating gases.

7. The heat-treating furnace as defined in claim 6 characterized by said heat responsive means being a pair of thermocouples, the combustion zone and the second thermocouple being intervened by said baffle means with the latter serving as a radiant heat shielding means, means interposed between said baffle means and the second thermocouple minimizing conduction transfer of heat from the former to the latter, and said temperature comparing indicating means comprising a pair of meters respectively connected to said pair of thermocouples for indicating the temperatures thereof for comparison.

8. The heat-treating furnace as defined in claim 6 characterized by means shielding said first temperature responsive means in the chamber from physical contact by solids-laden circulating gases therein without preventing substantial transfer of radiant heat to this temperature responsive means.

9. The heat-treating furnace as defined in claim 8 characterized by said baffle means being interposed between the combustion zone and said second temperature responsive means shielding the latter from radiant heat, said baffle means being supported in the top of said chamber by fluid-cooled means preceding the second heat responsive means minimizing transfer of heat of conduction to the latter from said baffle means.

10. A heat-treating furnace for production of relatively heavy particle size agglomerate bodies of solids from raw particulate solid materials under the influence of relatively high heat comprising, in combination, an upright chamber having a bottom opening serving simultaneously as a gravity discharge down flow outlet for heavy agglomerated heat-treated particle size solids constituting the product and an up flow combustion air inlet, means defining an exhaust gas opening in the top thereof for escape of gaseous products of combustion, an upright tubular Venturi structure having a bottom intake end and a top discharge end with a through updraft passage extending up from the intake end to the discharge end provided with an updraft constricted throat, means suspending in said chamber said Venturi structure with the bottom intake end of the latter located and spaced above the common air inlet and solids product discharge opening of said chamber for updraft flow from said opening into said intake end and with the top discharge end of said Venturi structure located and spaced below the exhaust gas opening of said chamber, said Venturi structure being suitably spaced on all sides from the surrounding walls of said chamber to define therebetween a downwardly-extending annular interior side passage laterally offset outwardly of said Venturi structure on all sides of the latter extending from the Venturi top discharge end to the Venturi bottom intake end permitting recirculation down this interior side passage of some of the gases emitted from said discharge end to said intake end laden with entrained solid particles, upwardly-directed fuel burner means mounted below said discharge end of the through Venturi passage in a position to feed fuel to the Venturi constricted throat and direct products of combustion produced thereat upwardly in said passage, baffle means intervening the exhaust gas opening and the Venturi top discharge end spaced therebetween and overhanging the latter with lateral spacing from chamber wall structure defining therebetween a tortuous exhaust passage therepast, said baffle means being of a shape to direct recirculation of some of the gases discharged from the Venturi discharge end down the interior side passage to the Venturi bottom intake end with solid particles entrained therein while freeing such solid particles from the remainder of the discharged gas during tortuous flow of the latter upwardly through the tortuous passage to the exhaust opening, and feed conduit means communicating the downwardly-extending annular interior side passage with an external source of supply of raw particulate solid materials for feed of the latter into the solids-laden recirculating gases which will flow down this side passage to the bottom intake end of the Venturi through passage.

11. A heat-treating furnace for production of relatively heavy particle size agglomerate bodies of solids from raw particulate solid materials under the influence of relatively high heat comprising, in combination, an upright chamber having side wall structure, a top wall and a bottom provided with a bottom opening serving simultaneously as a gravity discharge down flow outlet for heavy agglomerated heat-treated particle size solids constituting the product and an up flow combustion air inlet, means defining an exhaust gas opening in the top wall thereof for escape of gaseous products of combustion, an upright tubular Venturi structure having a bottom intake end and a top discharge end with a through updraft passage extending up from the intake end to the discharge end and with a section of this passage defining a combustion zone, means supporting in the bottom of said chamber said Venturi structure with the bottom intake end of the latter located and spaced above the common air inlet and solids product discharge opening of said chamber for updraft flow from said opening into said intake end and with the top discharge end of said Venturi structure located and spaced below the exhaust gas opening of said chamber, said Venturi structure being suitably spaced laterally from side wall structure of said chamber to define therebetween a side space communicating with said Venturi top discharge end by way of the top space between the latter and the exhaust gas opening with these communicating spaces serving as portions of a downwardly-extending interior side passage for recirculation of some of the gases emitted from said Venturi discharge end to said Venturi intake end laden with entrained solid particles, said supporting means being provided with at least one communicating way as another portion of the recirculation side passage extending to the bottom intake end of said Venturi structure from the side space upwardly-directed fuel burner means mounted below said discharge end of the through Venturi passage in a position to feed fuel to the combustion zone and direct products of combustion upwardly in said passage, fuel supply means extending through wall structure of said chamber and said Venturi structure supporting means to connection with said burner means, baffle means mounted in the top space intervening the exhaust gas opening and the Venturi top discharge end spaced therebetween and overhanging the latter with lateral spacing from chamber wall structure defining therebetween a tortuous exhaust passage therepast, said baffle means being of a shape to direct recirculation of some of the gases discharged from the Venturi discharge end down the interior side passage to the Venturi bottom intake end with solid particles entrained therein while freeing such solid particles from the remainder of the discharged gas during tortuous flow of the latter upwardly through the tortuous passage to the exhaust opening, and downwardly-directed feed conduit means extending through side wall structure of said chamber communicating the downwardly-extending interior side passage with an external source of supply of raw particulate solid materials for feed of the latter into the solids-laden recirculating gases which will flow down this side passage to the bottom intake end of the Venturi through passage in the same general downward direction of flow.

12. The heat-treating furnace as defined in claim 11 characterized by said baffle means being a structure suspended in said chamber below the exhaust gas outlet opening, and means supporting said suspended baffle structure mounted on the top of said chamber, said baffle supporting means having cooling air passages extending therethrough.

13. The heat-treating furnace as defined in claim 12 characterized by said baffle structure being in the form of an inverted conical body of refractory material carrying on the top thereof a plurality of transverse arms mounted to the top of said chamber to serve as said supporting means, the cooling air passages being provided as ducts extending through said arms to communication with the atmosphere surrounding said furnace.

14. In a furnace of heat-treating particulate solids suspended in hot flowing gases within a chamber having a fuel combustion zone and baffled exhaust gas outlet means, means to indicate the quantity of particulate solids entrained in hot flowing gases within the chamber comprising temperature responsive means located in the chamber at a point spaced from the combustion zone and subjected to heat radiating from the latter, the combustion zone and point being intervened by a path of flow of solids-laden hot gases with the quantity of the particulate solids entrained therein serving as a variable shield of the amount of radiated heat reaching said heat responsive means, other heat responsive means located in the baffled exhaust gas outlet at a point beyond appreciable influence of radiant heat emanating from the combustion zone for response to the heat of exhaust gases passing through said outlet means, and temperature comparing indicating means associated with both of said heat responsive means to indicate the temperatures at both for comparison determination of the quantity of solids entrained in the solids-laden hot gases in the chamber affecting the quantity of radiant heat reaching the first of said temperature responsive means.

15. In a furnace for heat-treating particulate solids suspended in hot flowing gases within a chamber having a fuel combustion zone and baffled exhaust gas outlet means, means to indicate the quantity of particulate solids entrained in hot flowing gases within the chamber comprising thermocouple means located in the chamber at a point subjected to heat radiating from the combustion zone and spaced from the latter, the combustion zone and the point being intervened by a path of flow of solids-laden hot gases with the quantity of the particulate solids entrained therein serving as a variable shield of the amount of radiated heat reaching said thermocouple means, means shielding said thermocouple means from the solids-laden gases flowing in the chamber while permitting said thermocouple means to respond to radiant heat emanating from the combustion zone, other thermocouple means located in the baffled exhaust gas outlet means at a point beyond appreciable influence of radiant heat emanating from the combustion zone for response to the heat of exhaust gases passing out through said outlet means, and comparative meter means indicating the temperatures of both of said thermocouple means serving as a measure of the quantity of solids entrained in the flow of solids-laden hot gases.

16. The means for indicating quantity of particulate solids entrained in hot flowing gases within a heat-treating furnace chamber as defined in claim 15 characterized by said second thermocouple means in the exhaust gas outlet means being shielded from radiant heat emanating from the combustion zone by the baffling means associated with the outlet means.

17. In a furnace for heat-treating particulate solids the combination with a heat-treating chamber having a fuel combustion zone therein, means defining an exhaust gas outlet and deflector baffle means intervening the combustion zone and exhaust gas outlet, of means to indicate the quantity of particulate solids entrained in hot flowing gases within the chamber comprising thermocouple means located in the chamber at a point spaced from the combustion zone where it is subjected to heat radiating from the combustion zone, the latter and such point being intervened by a path of flow of solids-laden hot gases with the quantity of the particulate solids entrained therein serving as a variable shield of the amount of radiated heat reaching said thermocouple means, shielding means covering said thermocouple and protecting the latter from physical contact by the solids-laden gases in the chamber while permitting it to respond to radiant heat emanating from the combustion zone, another thermocouple located in the gas outlet beyond said deflector baffle means with the latter intervening the combustion zone and this second thermocouple and effectively shielding this thermocouple from radiant heat emanating from the combustion zone, said second thermocouple being responsive to heat of exhaust gases passing through the exhaust gas outlet, and a pair of meters each associated with one of said thermocouples to provide comparison indications of the amount of radiant heat reaching the first thermocouple and the temperature of the exhaust gases at the second thermocouple serving as a measure of the quantity of solids entrained in the flow of solids-laden hot gases.

References Cited in the file of this patent

UNITED STATES PATENTS

| 1,861,213 | Green | May 31, 1932 |
| 2,149,076 | Stockbarger | Feb. 28, 1939 |
| 2,518,996 | Peckham | Aug. 16, 1950 |
| 2,561,394 | Marshall | July 24, 1951 |

FOREIGN PATENTS

| 739,617 | Great Britain | Nov. 2, 1955 |